Sept. 28, 1965  J. L. STERISS  3,208,370
FILTER DEVICE FOR COFFEE PERCOLATORS
Filed April 24, 1963
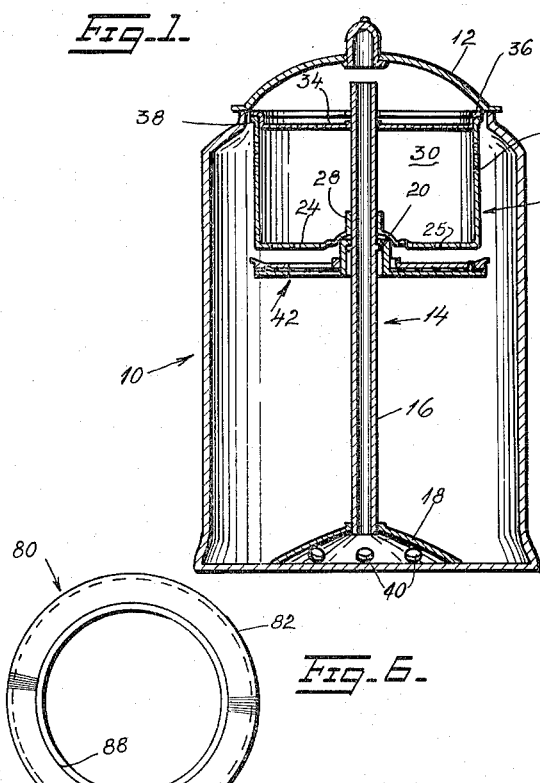
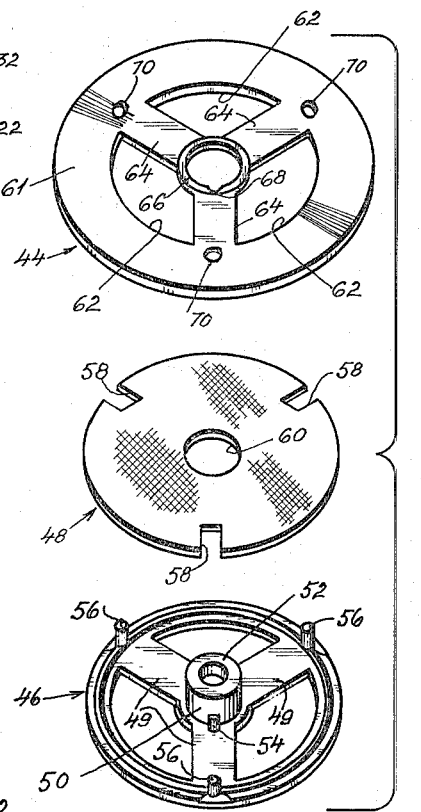
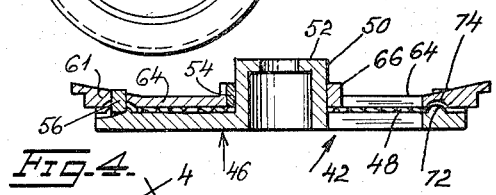
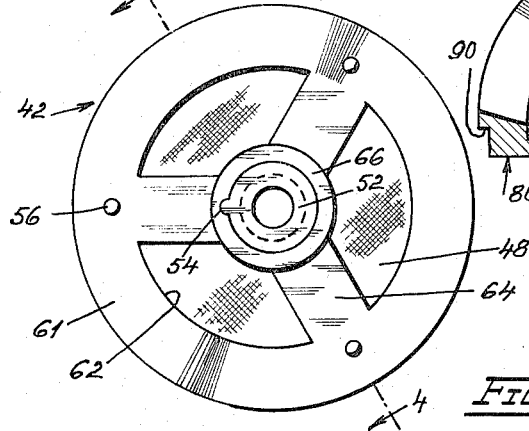
INVENTOR.
John Steriss
BY
Polachek & Saulsbury
ATTORNEYS

United States Patent Office 3,208,370
Patented Sept. 28, 1965

3,208,370
FILTER DEVICE FOR COFFEE PERCOLATORS
John L. Steriss, 4861 Broadway, New York 34, N.Y.
Filed Apr. 24, 1963, Ser. No. 275,276
1 Claim. (Cl. 99—298)

This invention relates to coffee percolators and more particularly to a strainer device to be used with a coffee percolator.

In conventional types of percolators, hot water is forced upwardly through a liquid delivery tube and is permitted to percolate downwardly through the coffee contained in a cartridge or bag in a receptacle or cup supported by the delivery tube. During the percolating operation, fine coffee or extraneous matter from the receptacle or cup often passes into the pot.

While various fabric cartridge containers or bags formed of filtering material have been used to contain such loose ground coffee during the percolation of water therethrough, such cartridges or bags being of specific size are not readily adaptable to the brewing of different quantities of coffee. Further, such containers being a manufactured item, require filling during manufacture, far in advance of usage, so that coffee contained therein has the opportunity to lose its freshness.

Accordingly, the principal object of the present invention is to provide a strainer for use with the conventional receptacle or cup of a coffee percolator which will prevent the passage of fine coffee or extraneous matter from the receptacle or cup into the pot.

Another object of the invention is to provide a strainer for a coffee percolator by means of which drip coffee may be made without the annoyance and trouble of the usual cartridge or bag.

Another important object of the invention is to provide a strainer for a coffee percolator that is readily manufacturable at low cost, and in large quantities, the structure being such as to be readily insertable over the delivery tube of the ordinary percolator and readily removed.

Yet another object is to provide a strainer for a coffee percolator that assures a clear brew free from fine grounds or dregs, which in ordinary practice find their way over the receptacle or cup and into the pot.

A specific object of the invention is to provide a strainer for a coffee percolator with an adapter to fit the strainer to various size coffee-containing cups.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a vertical sectional view through a coffee percolator embodying my invention.

FIG. 2 is a perspective disassembled view of the strainer.

FIG. 3 is a top plan view of the assembled strainer.

FIG. 4 is a cross-sectional view taken on the line 4—4 of FIG. 3.

FIG. 5 is a fragmentary view of the strainer unit with an adapter applied thereto.

FIG. 6 is a top plan view of the adapter.

Referring in detail to the drawings, in FIG. 1 a coffee pot embodying the invention is shown and designated generally by the reference numeral 10. The pot is provided with a removable lid 12.

Inside the pot, there is a percolator unit indicated as a whole by the numeral 14. The percolator unit comprises a liquid delivery tube 16 supported by a perforated steam dome 18 resting on the bottom of the coffee pot 10. The tube is formed with an external annular bead 20 above its mid-center. A receptacle or cup 22 is removably supported on the tube above the annular bead 20.

The receptacle 22 has a finely perforated bottom wall 24 with a central opening therein and extending upwardly from around the opening there is a hub or sleeve portion 28 sildably engaging the tube 16. A side wall 30 extends upwardly from the bottom wall 24 and the receptacle is open at the top, adjacent the top thereof. Perforations 32 may be formed in the wall 30 at the top thereof. A finely perforated removable cover or lid 34 is provided to close the open top of the receptacle.

A radial flange 36 on the periphery of the cover or lid 34 rests upon a radial flange 38 on the top edge of the side wall 30 of the receptacle.

The parts thus far described comprise the conventional type of coffee percolator apparatus in which hot liquid may enter the steam dome 18 through the openings 40 therein to be forced upwardly through the liquid delivery tube 16. The liquid, upon passing the upper end of the delivery tube 16, falls into the receptacle or cup 22 and percolates through the coffee grounds placed in the space therein around the tube 16, and out through the holes 25 in the bottom wall 24 of the receptacle or cup 22.

In accordance with the present invention, a strainer and trap unit 42 is slidably mounted upon the tube 16 and is positioned below and closely spaced from the bottom wall 24 of the receptacle or cup 22. This strainer unit 42, as best seen in FIG. 2, comprises three elements, to wit, a circular metal clamping plate 44, a metal base 46 and a disc 48 formed of filtering material. The base 46 is formed with three radial arms 49 extending between an outer ring and a central upstanding hub portion 50 provided with an inturned annular flange 52 that seats when assembled on the annular bead 20, below the hub 28 on the bottom wall 24 of the receptacle or cup 22. A protuberance 54 is formed on the outer surface of the hub portion 50 adjacent the base thereof, and three upstanding pins 56 project upwardly from the ring in line with the arms 49.

The disc 48 is formed from fabric or any suitable flexible filtering material. Three spaced notches 58 are formed in the periphery of the body of the disc, and an opening 60 is formed in the center of the body. The disc seats on the upper surface of the ring and arms of the base 46 with the notches 58 around the pins 56.

The clamping plate 44 is formed with an outer annular section 61 which is connected to a central hub 66 by a plurality of radially extending spokes 64. The upper surface of the outer annular section 61 is inclined downwardly and inwardly between the outer and inner peripheries thereof, as best seen in FIG. 4. The hub portion 66 is shallow and is formed with a notch 68 in its inner periphery. Spaced holes 70 are formed in the outer ring of the base 42, the spacing conforming to the spacing of the pins 56 on the base 46. Plate 44 fits over the base 46 and clamps the disc 48 therebetween, a cooperating annular bead 72 and an annular groove 74 formed on the base 46 and clamping plate 44, respectively, permitting this clamping action. The notch 68 in the hub portion 66 coacts with the protuberance 54 on the hub portion 50 of the base 46 to guide the clamping plate to proper clamping position. The periphery of the base 46 may be cut away around the base of the pins 56 to permit a tool to be inserted between the base and clamping plate 44 in order to facilitate disassembly of the parts.

In assembling the percolator unit, the tube 16 is first placed in the pot 10. The strainer unit 42 is next slid over the top of the tube in the pot until the flange 52 seats on the annular bead 20 on the tube. The receptacle or cup 22 is next slid over the top of the tube and therealong until its central hub portion seats on the annular flange 52 of the strainer unit. When the parts are thus assembled as seen in FIG. 1, in the percolating operation any fine coffee grounds or extraneous matter that is likely to flow over the top edge of side wall 30 of the receptacle or cup 22 passes downwardly along the outer surface of said side wall and falls onto the upwardly slanting body portion 61 of the clamping plate 44 where it is directed inwardly and downwardly onto the disc 48, and thus prevented from falling into the water in the pot.

The strainer unit 42 may be readily taken apart for cleaning purposes or for renewal of the disc element 48.

The present invention also contemplates provision of an adapter 80 to accommodate the strainer unit 42 to receptacles or cups 22 of various sizes. For this purpose a ring member 82 as seen in FIGS. 5 and 6 is provided. The body of the ring member has a flat base 84 and a top surface 86 that slants slightly upwardly and outwardly from the inner periphery of the body. The base extends inwardly from the inner periphery of the body forming an annular flange 88. The top of the body extends outwardly from the outer periphery of the body thereby forming an annular flange 90 at the top of the body. The frictional engagement of the outer periphery of the body portion 61 of plate 44 and the inner periphery of the body of ring 80 holds the adapter in place.

In use, when the receptacle or cup 22 is wider in diameter than the diameter of the clamping plate 44, the adapter 80 is attached to the clamping plate 44 by sliding the ring body 82 of the adapter upwardly until the shoulder 92 formed on the body 61 of the clamping plate 44 seats on the flange 88 on the body of the adapter 80 as seen in FIG. 5. When the adapter is thus applied to the clamping plate 44, the diameter of the clamping plate is enlarged accordingly and catches the drippings from the receptacle or cup 22.

From the foregoing, it will be apparent that there is provided a simple and efficient means for catching any fine grounds and drippings escaping from the receptacle or cup 22 during the percolation of the coffee.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

A trap and strainer unit for use with a coffee percolator comprising a pot having therein a pump, a tube which extends upwardly therefrom, and a cup having a perforated bottom wall which is mounted on the upper end of the tube and is adapted to contain ground coffee to be percolated, said trap and strainer unit being adapted to be removably mounted on said tube below and closely adjacent to the bottom wall of said cup for trapping and straining fine coffee grounds escaping from said cup and comprising: a base, a clamping plate, and a disc of filtering material which is clamped between said base and said clamping plate; said base comprising an outer ring which is secured to a central hub by a plurality of radially extending arms, and said clamping plate comprising an outer annular section which is connected to a central hub by a plurality of radially extending spokes; the said outer ring of said base having an annular bead on the top surface thereof, and the said outer annular section of said clamping plate having an annular groove in the bottom surface thereof which coacts with said bead to clamp said disc between said base and said clamping plate; the top surface of the annular outer section of said clamping plate being inclined downwardly and inwardly between the outer and inner peripheries thereof; a ring-shaped adapter which is removably applied to the outer periphery of said clamping plate and extends outwardly therefrom for increasing the diameter thereof, the upper surface of said adapter sloping downwardly and inwardly from the outer periphery thereof at the same inclination as the top surface of the said outer annular section of said clamping plate and constituting an annular extension of the said top surface of the outer annular section of said clamping plate, the outer periphery of said clamping plate and the inner periphery of said ring-shaped adapter being provided with cooperating annular flanges, the outer periphery of said clamping plate and the inner periphery of said ring-shaped adapter frictionally engaging each other to hold said adapter in position about said clamping plate.

References Cited by the Examiner

UNITED STATES PATENTS

| | | | |
|---|---|---|---|
| 133,582 | 12/72 | Hofman | 99—298 |
| 144,518 | 11/73 | Dunkelberger | 99—449 |
| 1,800,157 | 4/31 | Saunders | 251—331 |
| 2,120,860 | 6/38 | Ehlers. | |
| 2,383,144 | 8/45 | Moore | 99—284 X |
| 2,835,189 | 5/58 | Becker | 99—298 X |

ROBERT E. PULFREY, *Primary Examiner.*

JEROME SCHNALL, *Examiner.*